United States Patent
Shimizu et al.

(10) Patent No.: US 11,169,083 B2
(45) Date of Patent: Nov. 9, 2021

(54) METHOD OF MEASURING ADHESIVE STRENGTH OF COVER SHEET, AND CARRIER PLATE

(71) Applicant: Murata Manufacturing Co., Ltd., Kyoto (JP)

(72) Inventors: Yasuhiro Shimizu, Nagaokakyo (JP); Kiyoyuki Nakagawa, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 16/904,495

(22) Filed: Jun. 17, 2020

(65) Prior Publication Data
US 2020/0400551 A1 Dec. 24, 2020

(30) Foreign Application Priority Data
Jun. 21, 2019 (JP) .............................. JP2019-115879

(51) Int. Cl.
*G01N 19/04* (2006.01)
(52) U.S. Cl.
CPC .................................. *G01N 19/04* (2013.01)
(58) Field of Classification Search
CPC ................................................... G01N 19/04
USPC ............. 248/682, 27.1, 346.01, 346.03, 694; 73/150 A
See application file for complete search history.

(56) References Cited

U.S. PATENT DOCUMENTS

| | | | | |
|---|---|---|---|---|
| 1,986,424 A | * | 1/1935 | Berggren ................. | G03B 1/42 352/157 |
| 3,359,713 A | * | 12/1967 | Keyser ..................... | D01H 5/26 19/246 |
| 4,194,660 A | * | 3/1980 | Seitz ....................... | B65H 20/20 226/74 |

(Continued)

FOREIGN PATENT DOCUMENTS

| | | | |
|---|---|---|---|
| CN | 2017-07013 B | * | 1/2017 |
| JP | H07-36047 U | | 7/1995 |

(Continued)

OTHER PUBLICATIONS

An Office Action mailed by the Korean Intellectual Property Office dated Mar. 25, 2021, which corresponds to Korean Patent Application No. 10-2020-0063379 and is related to U.S. Appl. No. 16/904,495 with English language translation.

*Primary Examiner* — Robert R Raevis
(74) *Attorney, Agent, or Firm* — Studebaker & Brackett PC

(57) ABSTRACT

A method of quantitatively measuring the adhesive strength of a cover sheet of an electronic component housing container including a main body having multiple housing recesses in a longitudinal direction and a cover sheet peelably adhered to the main body. The method includes mounting the housing container on a carrier plate by fitting the housing recesses in one or more housing holes of the carrier plate which includes a plate body having the one or more housing holes in the longitudinal direction and multiple sprocket holes spaced apart from the housing holes in a width direction and arranged at regular intervals in the longitudinal direction; engaging some tooth tips of a sprocket in the sprocket holes; and peeling the cover sheet from the main body by rotating the sprocket using the width (Continued)

direction as an axis to move the carrier plate in the longitudinal direction.

8 Claims, 9 Drawing Sheets

(56) References Cited

U.S. PATENT DOCUMENTS

| | | | |
|---|---|---|---|
| 2009/0173660 A1* | 7/2009 | Lee | H05K 13/0084 206/713 |
| 2013/0266414 A1* | 10/2013 | Anderson | B65G 57/04 414/793.2 |
| 2018/0184555 A1 | 6/2018 | Rossmann et al. | |

FOREIGN PATENT DOCUMENTS

| | | |
|---|---|---|
| JP | 2018-118787 A | 8/2018 |
| KR | 10-2018-0073497 A | 7/2018 |

* cited by examiner

METHOD OF MEASURING ADHESIVE STRENGTH OF COVER SHEET, AND CARRIER PLATE

CROSS-REFERENCE TO RELATED APPLICATION

This application claims benefit of priority to Japanese Patent Application No. 2019-115879, filed Jun. 21, 2019, the entire content of which is incorporated herein by reference.

BACKGROUND

Technical Field

The present disclosure relates to a method of measuring the adhesive strength of a cover sheet. The present disclosure also relates to a carrier plate used in the method of measuring the adhesive strength of a cover sheet.

Background Art

Examples of package forms of electronic components such as multilayer ceramic capacitors include one in which multiple electronic components are packed in a housing container. In the handling process of a housing container from packing electronic components therein to setting the housing container in a feeder, a method of sealing a housing container by means such as heat welding of a cover film to a top side of a portion where electronic components are housed has been suggested in order to prevent mixing of different materials or different products, to prevent spilling of small electronic components, and to provide a gas barrier to prolong the lifetime of the electronic components.

JP 2018-118787 A discloses a magazine (package) for housing individualized electronic components. The package disclosed in Patent Literature 1 includes a receiving structure (main body) including multiple cavities (housing recesses) in a longitudinal direction, a cover structure (cover) on the upper side of the main body, and a sealing foil (cover sheet) between the main body and the cover, wherein the cover sheet is removably connected to the main body.

SUMMARY

No means have been established to quantitatively measure the adhesive strength of a cover sheet of an electronic component housing container in which the cover sheet is peelably adhered to a main body.

Therefore, the present disclosure provides a method capable of quantitatively measuring the adhesive strength of a cover sheet of an electronic component housing container including the cover sheet peelably adhered to a main body. The present disclosure also aims to provide a carrier plate used in the method of measuring the adhesive strength of a cover sheet.

The present disclosure provides a method of measuring the adhesive strength of a cover sheet. The method is applicable to an electronic component housing container including a main body including multiple housing recesses that house electronic components in a longitudinal direction in which each housing recess includes an opening portion on one side in a height direction, and the cover sheet peelably adhered to the main body to cover the opening portion of each housing recess. The method includes mounting the electronic component housing container on a carrier plate by fitting the housing recesses in one or more housing holes of the carrier plate. The carrier plate includes a plate body having the one or more housing holes that receive the housing recesses in the longitudinal direction and multiple sprocket holes spaced apart from the housing holes in a width direction perpendicular to the longitudinal direction and arranged at regular intervals in the longitudinal direction. The method further includes engaging some tooth tips of a sprocket including multiple such tooth tips on a periphery in the sprocket holes of the carrier plate carrying the electronic component housing container; and peeling the cover sheet from the main body by rotating the sprocket using the width direction as an axis to move the carrier plate in the longitudinal direction.

The present disclosure provides a carrier plate that is used to carry an electronic component housing container including a main body including multiple housing recesses that house electronic components in a longitudinal direction in which each housing recess includes an opening portion on one side in a height direction, and a cover sheet peelably adhered to the main body to cover the opening portion of each housing recess. The carrier plate includes a plate body having one or more housing holes that receive the housing recesses in the longitudinal direction and multiple sprocket holes spaced apart from the housing holes in a width direction perpendicular to the longitudinal direction and arranged at regular intervals in the longitudinal direction.

The present disclosure can quantitatively measure the adhesive strength of a cover sheet of an electronic component housing container including the cover sheet peelably adhered to a main body.

DETAILED DESCRIPTION

Hereinbelow, a method of measuring the adhesive strength of a cover sheet and a carrier plate of the present disclosure are described.

The present disclosure is not limited to the following preferred embodiments, and may be suitably modified without departing from the gist of the present disclosure. Combinations of two or more preferred features described in the following preferred embodiments are also within the scope of the present disclosure.

Method of Measuring Adhesive Strength of Cover Sheet

The method of measuring the adhesive strength of a cover sheet of the present disclosure is a method of measuring the adhesive strength of a cover sheet of an electronic component housing container including a main body and the cover sheet peelably adhered to the main body.

Figure 1:
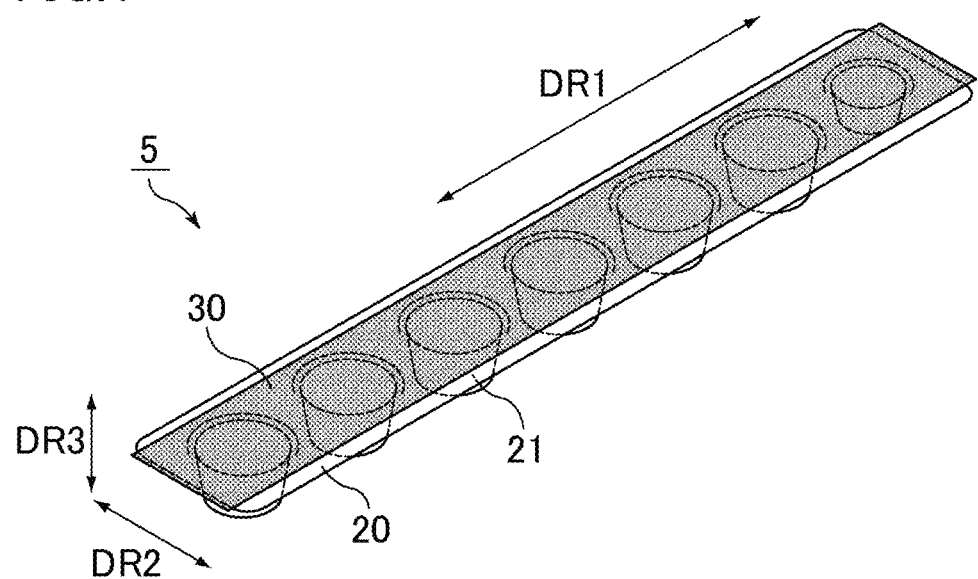
FIG. 1 is a schematic perspective view of an example of an electronic component housing container used in a method of measuring the adhesive strength of a cover sheet of the present disclosure.
Figure 2:
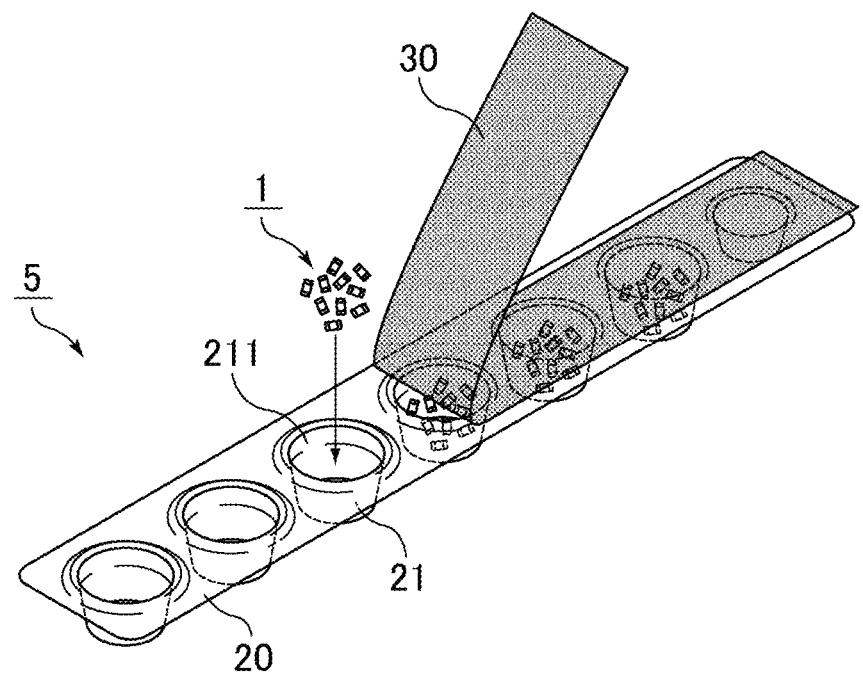
FIG. 2 is a perspective view of a state in which a cover sheet is peeled from a main body in the electronic component housing container shown in FIG. 1.

FIG. 1 is a schematic perspective view of an example of an electronic component housing container used in the method of measuring the adhesive strength of a cover sheet of the present disclosure. FIG. 2 is a perspective view of a state in which a cover sheet is peeled from a main body in the electronic component housing container shown in FIG. 1.

An electronic component housing container 5 shown in FIG. 1 includes a main body 20 and a cover sheet 30. For example, the electronic component housing container 5 has a longitudinal direction (DR1 direction) and a width direction (DR2 direction) and is formed in a long shape. The longitudinal direction is a direction parallel to a sliding direction (AR1 direction in FIG. 13) described later, and the width direction is a direction perpendicular to the longitudinal direction. In a plan view seen from a height direction (DR3 direction), the main body 20 and the cover sheet 30 each have a rectangular shape, for example. The height direction is a direction perpendicular to the longitudinal direction and the width direction.

The main body 20 extends in the longitudinal direction. The main body 20 includes multiple housing recesses 21 that house electronic components 1 (see FIG. 2). In the electronic component housing container 5 shown in FIG. 1, the main body 20 includes seven housing recesses 21.

The housing recesses 21 are arranged in the longitudinal direction. In the electronic component housing container 5 shown in FIG. 1, the seven housing recesses 21 are arranged in one line in the longitudinal direction.

As shown in FIG. 2, each housing recess 21 has an opening portion 211 on one side in the height direction. In a plan view seen from the height direction, the opening portion 211 has a substantially circular shape, for example.

The main body 20 can be formed by processing a sheet, for example. Examples of materials of the main body 20 include polystyrene and polyethylene terephthalate containing a conductive material such as carbon or a conductive coating material kneaded thereinto. The main body 20 has a thickness of about 0.5 mm, for example.

The cover sheet 30 covers the opening portions 211 of the housing recesses 21. The cover sheet 30 is peelably adhered to at least a portion of the main body 20.

The cover sheet 30 has a strip shape. In the longitudinal direction, the cover sheet 30 is longer than the main body 20. Preferably, the length of the cover sheet 30 is at least two times the length of the main body 20.

Examples of materials of the cover sheet 30 include polyethylene terephthalate, polycarbonate, acrylic resin, and vinyl chloride. The cover sheet 30 may be coated with a metal. The cover sheet 30 has a total thickness of about 50 μm, for example.

Figure 3A:
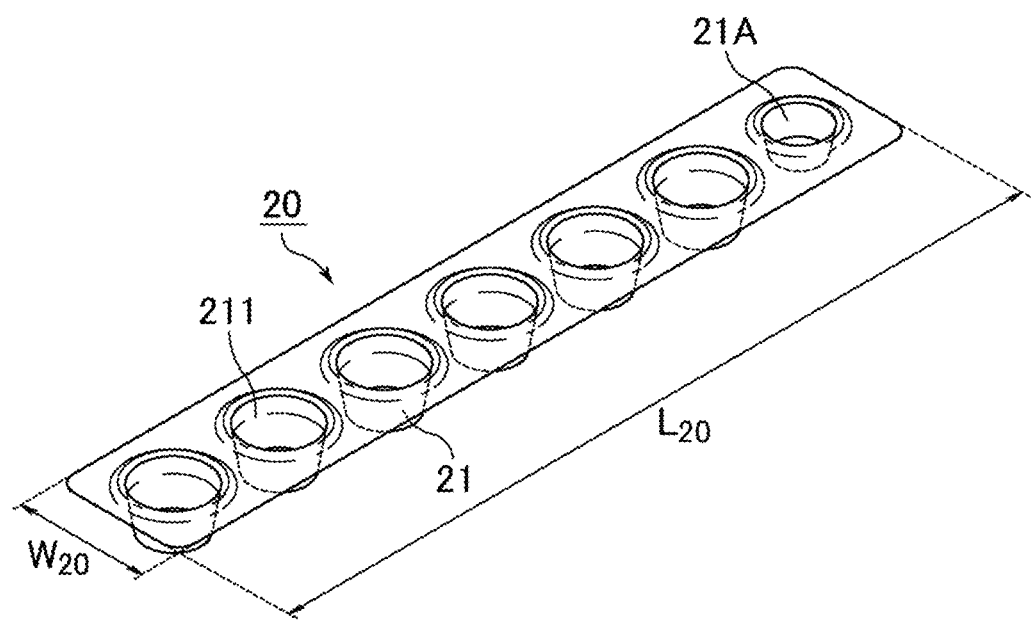
FIG. 3A and FIG. 3B are schematic perspective views of the main body of the electronic component housing container shown in FIG. 1.
Figure 3B:
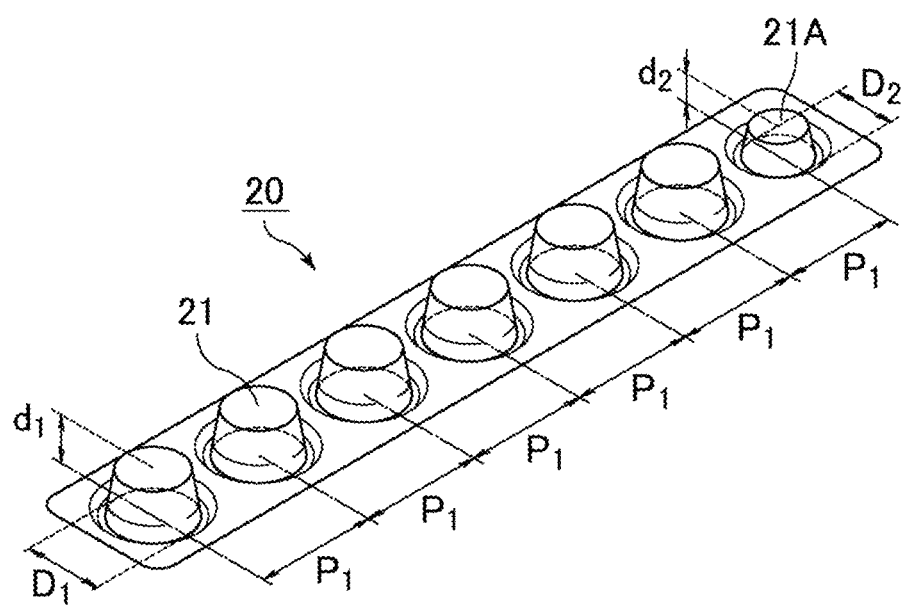

FIG. 3A and FIG. 3B are schematic perspective views of the main body of the electronic component housing container shown in FIG. 1.

In the present embodiment, as shown in FIG. 3A and FIG. 3B, among seven housing recesses 21, a housing recess 21A at one end of the main body 20 in the longitudinal direction has the opening portion 211 with a smaller area and a smaller depth dimension than those of the other housing recesses 21.

The main body 20 has a longitudinal dimension (a length indicated by $L_{20}$ in FIG. 3A) of 168 mm±1 mm, for example. The main body 20 has a width dimension (a length indicated by $W_{20}$ in FIG. 3A) of 32 mm±0.3 mm, for example.

The housing recesses 21 excluding the housing recess 21A each have an outer diameter (a length indicated by $D_1$ in FIG. 3B) of 19 mm±0.2 mm, for example. The housing recesses 21 excluding the housing recess 21A each have a depth dimension (a length indicated by $d_1$ in FIG. 3B) of 12.5 mm±0.5 mm, for example.

The housing recess 21A has an outer diameter (a length indicated by $D_2$ in FIG. 3B) of 15 mm±0.2 mm, for example. The housing recess 21A has a depth dimension (a length indicated by $d_2$ in FIG. 3B) of 5.5 mm±0.5 mm, for example. Preferably, the outer diameter, depth dimension, and volume of the housing recess 21A are respectively 80% or less, 50% or less, and 30% or less of those of the other housing recesses 21.

The housing recesses 21 including the housing recess 21A have a pitch (a length indicated by $P_1$ in FIG. 3B) of 24.0 mm±0.1 mm, for example.

The pitch of the housing recesses means the distance between centers of adjacent housing recesses.

The method of measuring the adhesive strength of a cover sheet of the present disclosure includes mounting the electronic component housing container on a carrier plate by fitting the housing recesses in housing holes of the carrier plate; engaging some tooth tips of a sprocket in sprocket holes of the carrier plate carrying the electronic component housing container; and, peeling the cover sheet from the main body by rotating the sprocket to move the carrier plate in the longitudinal direction.

The method of measuring the adhesive strength of a cover sheet of the present disclosure uses a carrier plate including housing holes for mounting of an electronic component housing container and including sprocket holes for feeding. This makes it possible to measure the adhesive strength of a cover sheet using a peel strength tester used for conventional taping electronic component packages.

A taping electronic component package is one package form of electronic components, in which electronic components are housed in a long carrier tape including multiple recesses in a longitudinal direction, and the multiple recesses are covered by a cover tape on top of the carrier tape.

With regard to the taping electronic component package, there are known methods and known devices in which the peel strength of a cover tape is measured by peeling a cover tape while a carrier tape is fed by engaging some tooth tips of a sprocket in sprocket holes of the carrier tape.

As described above, the carrier plate used in the method of measuring the adhesive strength of a cover sheet of the present disclosure includes the sprocket holes that resemble a carrier tape used in the taping electronic component package. This makes it possible to measure the adhesive strength of a cover sheet using an existing method and an existing device.

The present disclosure also encompasses the carrier plate used in the method of measuring the adhesive strength of a cover sheet of the present disclosure.

Carrier Plate

Figure 4:
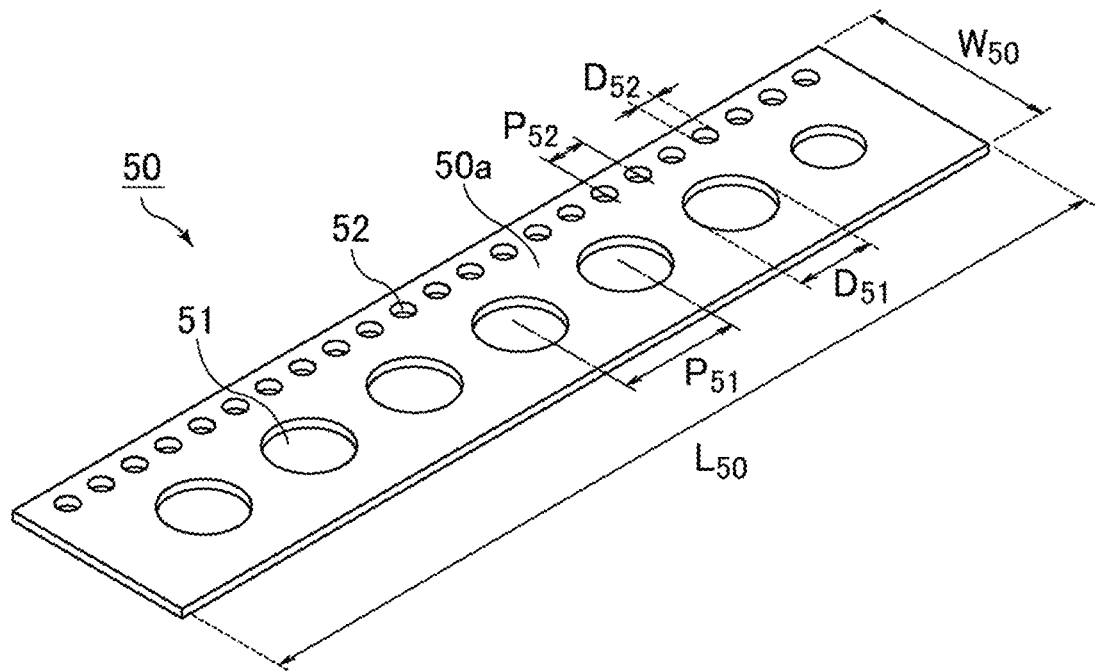
FIG. 4 is a schematic perspective view of an example of a carrier plate used in the method of measuring the adhesive strength of a cover sheet of the present disclosure.
Figure 5:
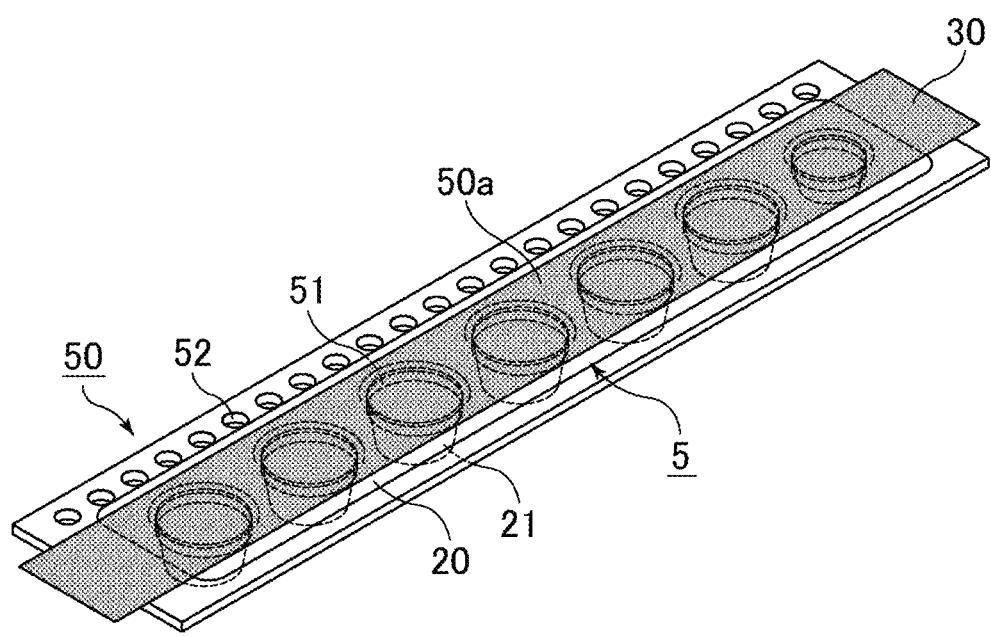
FIG. 5 is a perspective view of a state in which the electronic component housing container shown in FIG. 1 is mounted on the carrier plate shown in FIG. 4.

FIG. 4 is a schematic perspective view of an example of a carrier plate used in the method of measuring the adhesive strength of a cover sheet of the present disclosure. FIG. 5 is a perspective view of a state in which the electronic component housing container shown in FIG. 1 is mounted on the carrier plate shown in FIG. 4.

A carrier plate 50 shown in FIG. 4 includes a plate body 50a having multiple housing holes 51 and multiple sprocket holes 52.

The housing holes 51 are arranged in a longitudinal direction. In the carrier plate 50 shown in FIG. 4, the multiple housing holes 51 are arranged in one line in the longitudinal direction. In a plan view seen from a height direction, the housing holes 51 each have a substantially circular shape, for example.

As shown in FIG. 5, the housing recesses 21 fit in the respective housing holes 51. This can fix the main body 20 of the electronic component housing container 5 in place.

Sprocket holes 52 are spaced apart from the housing holes 51 in a width direction and arranged at regular intervals in the longitudinal direction. In a plan view seen from the height direction, the sprocket holes 52 each have a substantially circular shape, for example.

As described later, some tooth tips of a sprocket engage in the sprocket holes 52 of the carrier plate 50. This makes it possible to feed the main body 20 of the electronic component housing container 5 while the electronic component housing container 5 is mounted on the carrier plate 50.

Examples of materials of the carrier plate 50 include metal materials such as stainless steel (SUS) and aluminum. The carrier plate 50 has a thickness of about 0.5 mm, for example.

The carrier plate 50 has a longitudinal dimension (a length indicated by $L_{50}$ in FIG. 4) of 280 mm±0.5 mm, for example. The longitudinal dimension $L_{50}$ of the carrier plate 50 is larger than the longitudinal dimension $L_{20}$ of the main body 20, and specifically, it is preferably 120% to 180% of the longitudinal dimension $L_{20}$ of the main body 20.

The carrier plate 50 has a width dimension (a length indicated by $W_{50}$ in FIG. 4) of 44 mm±0.3 mm, for example. The width dimension $W_{50}$ of the carrier plate 50 is larger than the width dimension $W_{20}$ of the main body 20, and specifically, it is preferably 120% to 150% of the width dimension $W_{20}$ of the main body 20.

The housing holes 51 that receive the housing recesses 21 excluding the housing recess 21A each have an outer diameter (a length indicated by $D_{51}$ in FIG. 4) of 19.1 mm±0.1 mm, for example. Preferably, the outer diameter $D_{51}$ of each housing hole 51 is 8% to 12% of the outer diameter $D_1$ of each housing recess 21.

The housing holes 51 have a pitch (a length indicated by $P_{51}$ in FIG. 4) that is the same as the pitch $P_1$ of the housing recesses 21 of the main body 20.

The pitch of the housing holes means the distance between centers of adjacent housing holes.

The sprocket holes 52 each have an outer diameter (a length indicated by $D_{52}$ in FIG. 4) of 1.55 mm±0.05 mm, for example. The outer diameter $D_{52}$ of each sprocket hole 52 is smaller than the outer diameter $D_{51}$ of each housing hole 51, and specifically, it is preferably 13% or less of the outer diameter $D_{51}$ of each housing hole 51.

The sprocket holes 52 have a pitch (a length indicated by $P_{52}$ in FIG. 4) of 4 mm±0.1 mm, for example. The pitch $P_{52}$ of the sprocket holes 52 is shorter than the pitch $P_{51}$ of the housing holes 51, and specifically, it is preferably 17% or less of the pitch $P_{51}$ of each housing hole 51.

The pitch of the sprocket holes means the distance between centers of adjacent sprocket holes.

For example, about six sprocket holes 52 are provided between two adjacent housing holes 51 in the longitudinal direction. Preferably four to eight sprocket holes 52 are provided between two adjacent housing holes 51 in the longitudinal direction.

The following describes an example of the method of measuring the adhesive strength of a cover sheet using an existing peel strength tester. A peel strength tester that can be used is, for example, Emboss Carrier Tape Peeling Force Tester (EPI Co., Ltd., PTS-5000).

Figure 6:
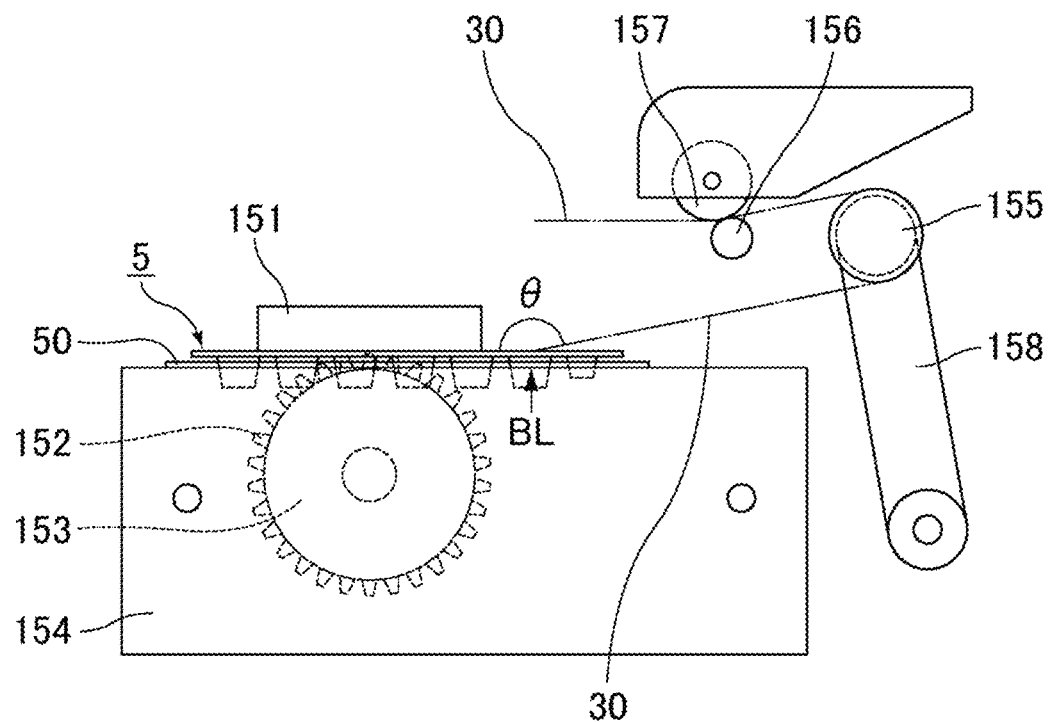
FIG. 6 is a schematic plan view of an example of the method of measuring the adhesive strength of a cover sheet of the present disclosure.
Figure 7:
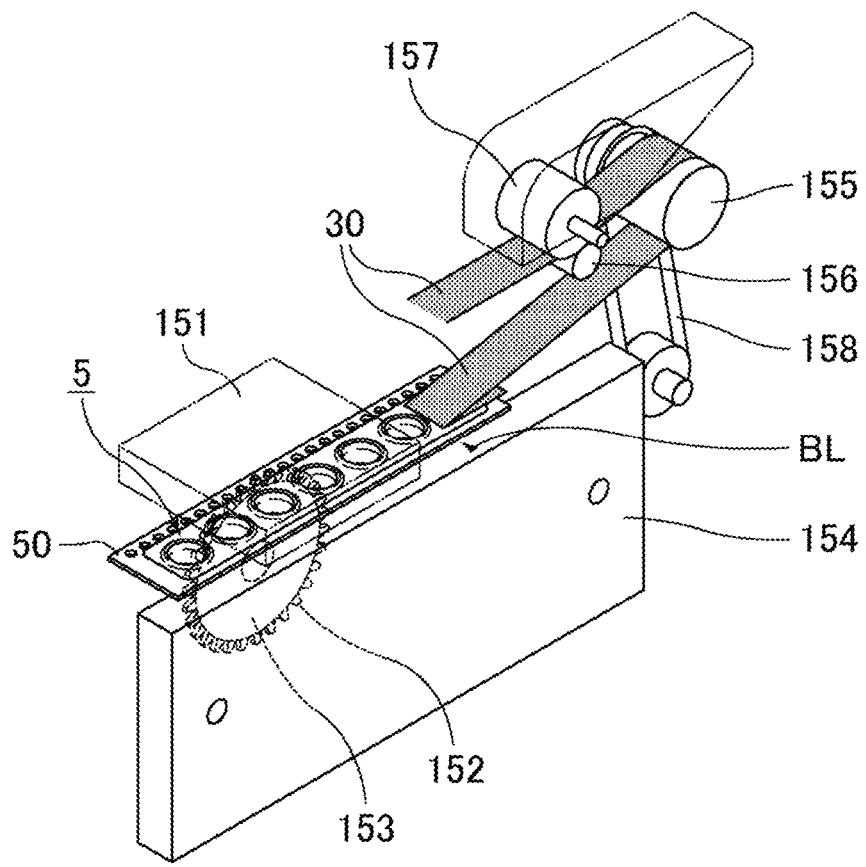
FIG. 7 is a schematic perspective view of an example of the method of measuring the adhesive strength of a cover sheet of the present disclosure.

FIG. 6 is a schematic plan view of an example of the method of measuring the adhesive strength of a cover sheet of the present disclosure. FIG. 7 is a schematic perspective view of an example of the method of measuring the adhesive strength of a cover sheet of the present disclosure.

First, with a pressing plate 151 standing, the cover sheet 30 at the end of the electronic component housing container 5 mounted on the carrier plate 50 is peeled up to a peeling line BL at the rear of the pressing plate 151. Next, some tooth tips 152 of a sprocket 153 including multiple tooth tips 152 on a periphery engage in the sprocket holes 52 (see FIG. 4) of the carrier plate 50 carrying the electronic component housing container 5. Subsequently, the pressing plate 151 is folded down to fix the carrier plate 50 carrying the electronic component housing container 5 on a guide rail 154.

The peeled cover sheet 30 is rolled up on a peeling roller 155, and the cover sheet 30 folded back is passed between a transfer roller 156 and a pressing roller 157.

In the above state, the sprocket 153 is rotated using the width direction as an axis to move the carrier plate 50 in the longitudinal direction, whereby the cover sheet 30 is peeled from the main body 20 (see FIG. 5). The transfer roller 156 rolls up the cover sheet 30 peeled from the main body 20 while moving the carrier plate 50 in the longitudinal direction.

As a result, the adhesive strength of the cover sheet 30 is measured by a load cell (not shown) via a lever member 158. In this case, the force applied to the peeling roller 155 around which the cover sheet 30 is rolled up is transmitted to the load cell via the lever member 158.

In the peeling the cover sheet from the main body in the method of measuring the adhesive strength of a cover sheet of the present disclosure, preferably, a peeling angle (an angle indicated by θ in FIG. 6) of the cover sheet relative to the main body is kept constant. The adhesive strength of the cover sheet can be correctly measured by keeping the peeling angle of the cover sheet relative to the main body constant.

In the peeling the cover sheet from the main body, the peeling angle of the cover sheet relative to the main body may not be necessarily constant as long as the difference is in the range of about 3%.

In order to keep the peeling angle of the cover sheet relative to the main body constant, preferably, the method of measuring the adhesive strength of a cover sheet of the present disclosure further includes rolling up the cover sheet peeled from the main body while moving the carrier plate in the longitudinal direction. Particularly, the cover sheet peeled from the main body is preferably rolled up in synchronization with the moving speed of the carrier plate.

In the method of measuring the adhesive strength of a cover sheet of the present disclosure, the housing holes of the carrier plate are not limited in terms of shape, size, number, arrangement, and the like, as long the housing recesses of the main body defining the electronic component housing container can fit in the housing holes.

In the method of measuring the adhesive strength of a cover sheet of the present disclosure, the sprocket holes of the carrier plate are not limited in terms of shape, size, number, arrangement, and the like, as long as the tooth tips of the sprocket can engage in the sprocket holes. The multiple sprocket holes may be arranged in two lines.

Figure 8:
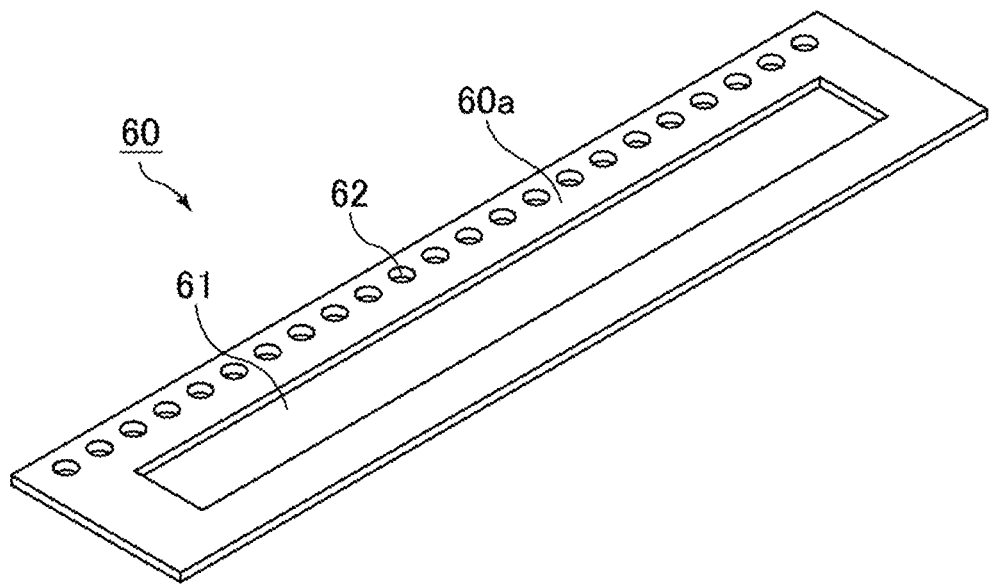
FIG. 8 is a schematic perspective view of another example of the carrier plate used in the method of measuring the adhesive strength of a cover sheet of the present disclosure.

FIG. 8 is a schematic perspective view of another example of the carrier plate used in the method of measuring the adhesive strength of a cover sheet of the present disclosure.

A carrier plate 60 shown in FIG. 8 includes a plate body 60*a* having one housing hole 61 and multiple sprocket holes 62.

The housing hole 61 is arranged in a longitudinal direction. In a plan view seen from a height direction, the housing hole 61 has a rectangular shape, for example. Alternatively, in a plan view seen from the height direction, the housing hole 61 may have an obround shape (a racetrack shape).

As shown in FIG. 8, the plate body of the carrier plate may have only one housing hole. Multiple housing recesses fit together in one housing hole. This can fix the main body of the electronic component housing container in place.

Figure 9:
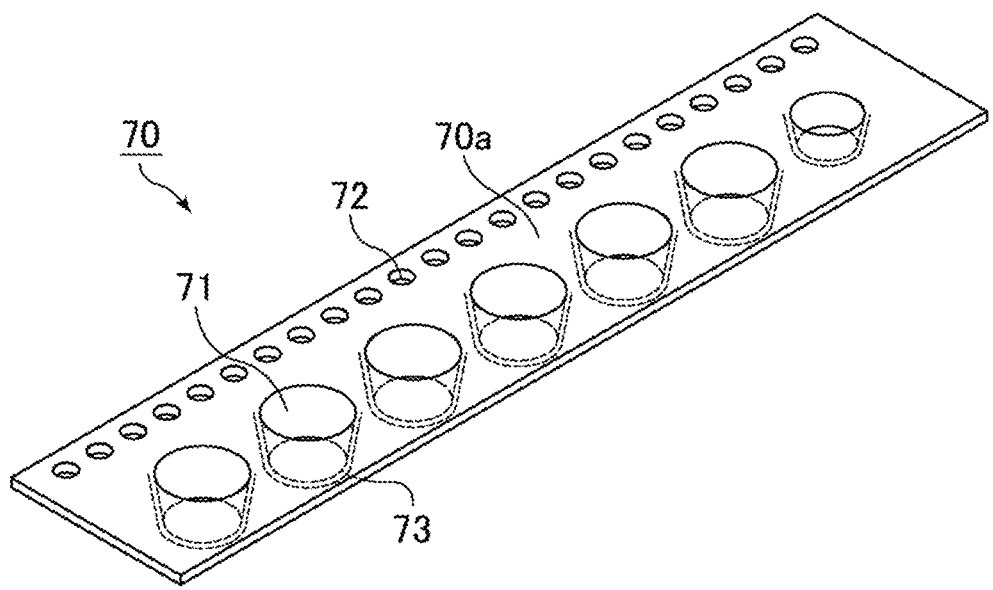
FIG. 9 is a schematic perspective view of still another example of the carrier plate used in the method of measuring the adhesive strength of a cover sheet of the present disclosure.

FIG. 9 is a schematic perspective view of still another example of the carrier plate used in the method of measuring the adhesive strength of a cover sheet of the present disclosure.

A carrier plate 70 shown in FIG. 9 includes a plate body 70*a* having multiple sprocket holes 72 and multiple recesses 73.

The recesses 73 are arranged in a longitudinal direction. In the carrier plate 70 shown FIG. 9, the multiple recesses 73 are arranged in one line in the longitudinal direction.

As shown in FIG. 9, each recess 73 has a housing hole 71 that opens toward one side of a height direction. In a plan view seen from the height direction, the housing holes 71 each have a substantially circular shape, for example.

As shown in FIG. 9, the plate body of the carrier plate may include multiple recesses and each recess may include a housing hole that opens toward one side of the height direction. The housing recesses fit in the respective recesses of the carrier plate. This can fix the main body of the electronic component housing container in place.

Sprocket holes 62 of the carrier plate 60 shown in FIG. 8 and sprocket holes 72 of the carrier plate 70 shown in FIG. 9 have the same configuration as that of the sprocket holes 52 of the carrier plate 50 shown in FIG. 4. Some tooth tips of the sprocket engage in these sprocket holes. This makes it possible to feed the main body of the electronic component housing container while the electronic component housing container is mounted on the carrier plate.

The materials, thickness, longitudinal dimension, and width dimension of the carrier plates 60 and 70 are the same as those of the carrier plate 50. The outer diameter and pitch of the sprocket holes 62 and 72 are the same as those of the sprocket holes 52. The pitch of the housing holes 71 is the same as the pitch of the housing holes 51.

Preferably, the electronic component housing container that has been described above further includes a cover to sandwich the cover sheet between the cover and the main body. The electronic component housing container can also be used as an electronic component package by housing electronic components in the housing recesses.

Figure 10:
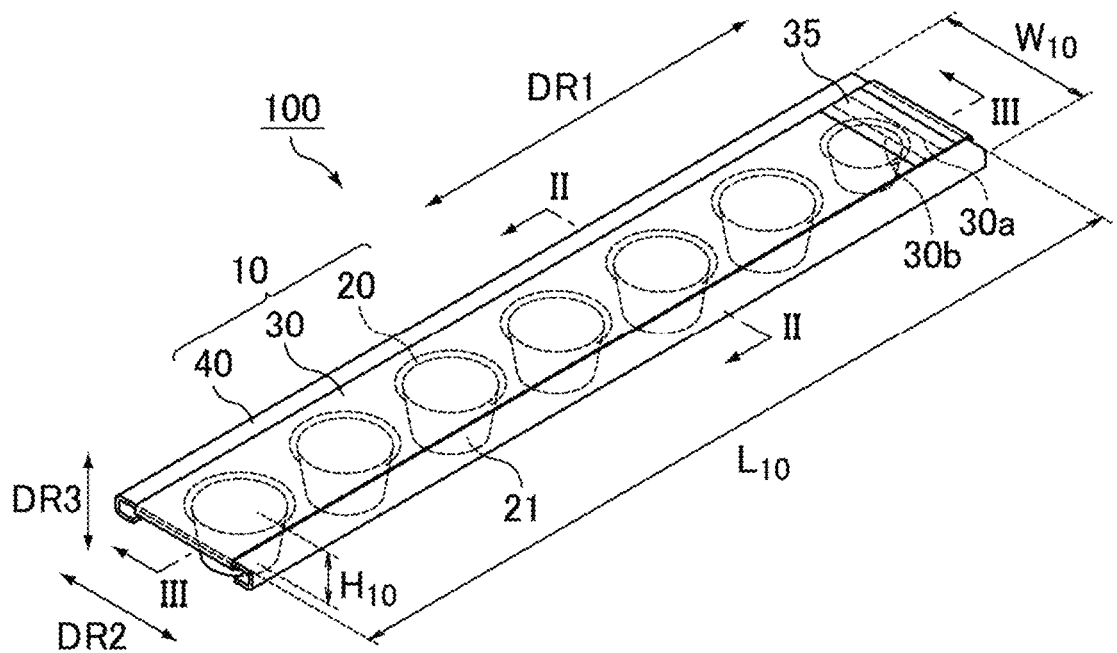
FIG. 10 is a schematic perspective view of an example of an electronic component package.
Figure 11:
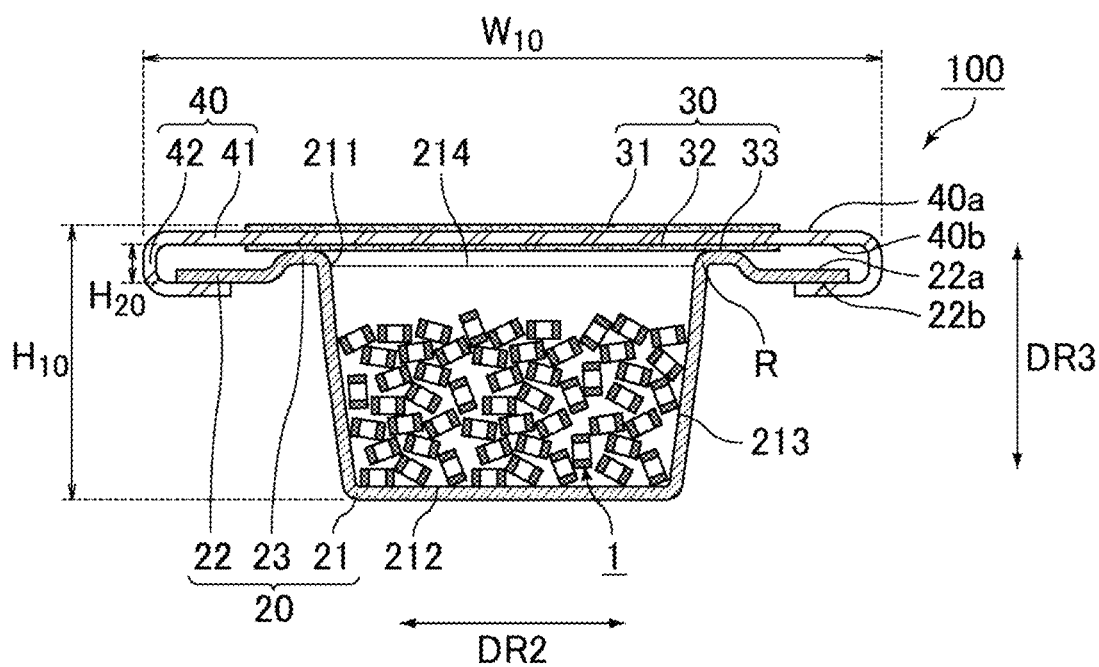
FIG. 11 is a cross-sectional view taken along line II-II of the electronic component package shown in FIG. 10.
Figure 12:
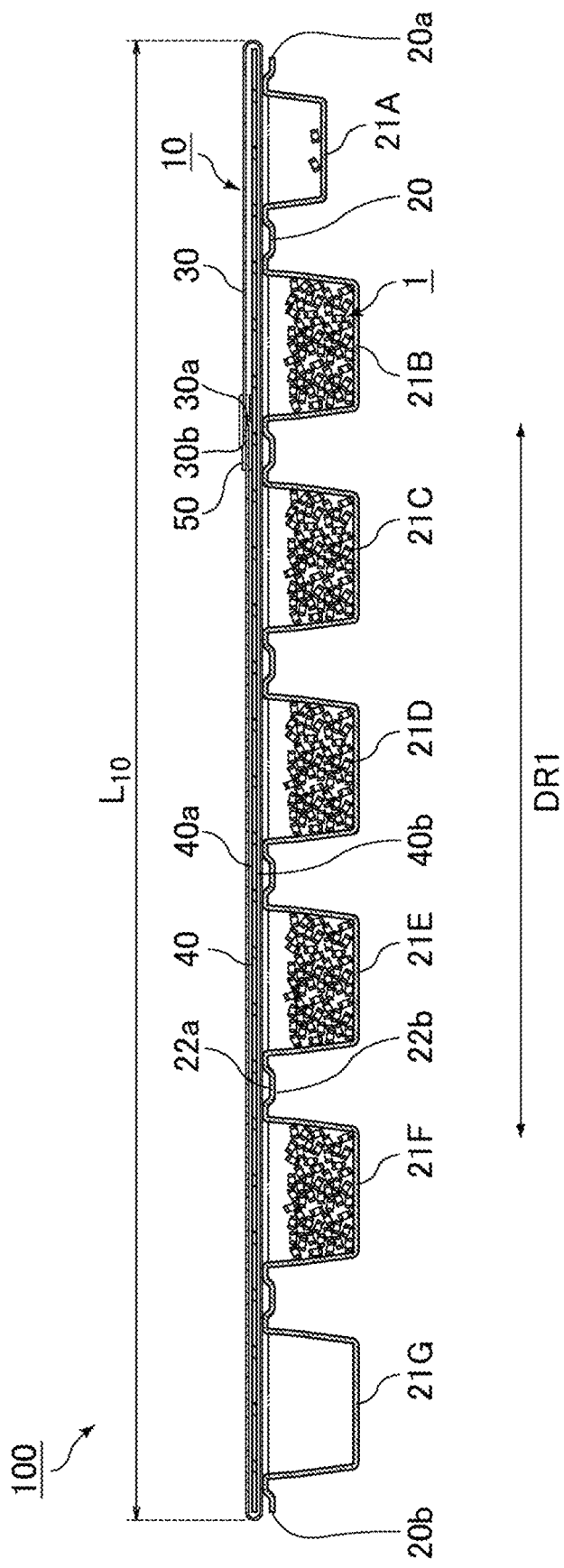
FIG. 12 is a cross-sectional view taken along line of the electronic component package shown in FIG. 10.

FIG. 10 is a schematic perspective view of an example of an electronic component package. FIG. 11 is a cross-sectional view taken along line II-II of the electronic component package shown in FIG. 10. FIG. 12 is a cross-sectional view taken along line of the electronic component package shown in FIG. 10.

An electronic component package 100 shown in FIG. 10, FIG. 11, and FIG. 12 includes an electronic component housing container 10 and the multiple electronic components 1 (see FIG. 11 and FIG. 12) housed in the electronic component housing container 10.

As shown in FIG. 10, the electronic component housing container 10 includes the main body 20, the cover sheet 30, and a cover 40. For example, the electronic component housing container 10 has a longitudinal direction (DR1 direction) and a width direction (DR2 direction) and is formed in a long shape. In a plan view seen from a height direction (DR3 direction), the main body 20, the cover sheet 30, and the cover 40 each have a rectangular shape, for example.

The main body 20 and the cover sheet 30 defining the electronic component housing container 10 have the same configurations as those of the main body 20 and the cover sheet 30 defining the electronic component housing container 5, respectively.

The cover 40 is arranged to sandwich a portion of the cover sheet 30 between the cover 40 and the main body 20. The cover 40 fits over the main body 20 in such a manner that it can slide relative to the main body 20 in the longitudinal direction.

In the longitudinal direction, the cover 40 is longer than the main body 20. Preferably, the length of the cover 40 is equal to or less than half the length of the cover sheet 30.

As shown in FIG. 11 and FIG. 12, the multiple electronic components 1 are housed in one or more housing recesses 21 of the electronic component housing container 10.

As described later, the electronic component package 100 is configured in such a manner that the electronic components 1 housed in the housing recesses 21 can be taken out by sliding the cover 40 relative to the main body 20 in the longitudinal direction.

For example, the electronic components 1 are multilayer ceramic capacitors. The size of each electronic component 1 is not limited. For example, the size may be 1005, 0603, 0402, or the like. As an example, in the case of size 1005, the longitudinal dimension (L dimension) is 1.0 mm and the width dimension (W dimension) is 0.5 mm. The thickness dimension (T dimension) is not specified in JIS, but it is 0.5 mm, for example. Here, the L dimension, W dimension, and T dimension are all design target values, and are not necessarily accurately 1.0 mm, 0.5 mm, and 0.5 mm, respectively. In other words, all the L dimension, W dimension, and T dimension have tolerance.

In FIG. 12, the electronic components 1 which are genuine products are housed in five housing recesses 21B, 21C, 21D, 21E, and 21F other than housing recesses 21A and 21G at ends. A few electronic components 1 for inspection are housed in the housing recess 21A at a first end 20a of the main body 20. No electronic components 1 are housed in the housing recess 21G at a second end 20b of the main body 20. Yet, the electronic components 1 which are genuine products may be housed in the housing recess 21G. When the housing recess 21A is not used for inspection, no electronic components 1 may be housed in the housing recess 21A.

In the following description, the term "the housing recesses 21" means the housing recesses that house the electronic components 1 which are genuine products (i.e., the housing recesses 21B, 21C, 21D, 21E, and 21F in FIG. 12), unless otherwise stated.

Main Body

In the present embodiment, as shown in FIG. 11, the main body 20 includes the housing recesses 21, strip portions 22, and a bulge portion 23.

The multiple housing recesses 21 may be arranged in one, two, or three lines as long as they are arranged in the longitudinal direction. In addition, the multiple housing recesses 21 may be arranged in a matrix, staggered (zigzag), or random manner.

Preferably, among the multiple housing recesses 21, the housing recess 21A at the first end 20a of the main body 20 in the longitudinal direction is a housing recess for direction identification in which at least one of area or depth dimension of the opening portion is smaller than those of other housing recesses.

Providing a housing recess having a different size only at one end of the main body in the longitudinal direction makes the direction identifiable by the appearance. This can reduce the risk of attaching the electronic component housing container to equipment such as a fixing device (described later) in a wrong direction or peeling the cover sheet in a wrong direction.

Preferably, among the multiple housing recesses 21, the housing recess 21A at the first end 20a of the main body 20 in the longitudinal direction is a housing recess for inspection which houses a smaller number of electronic components than other housing recesses.

In this case, pre-use inspection can be accomplished by individually taking out only the electronic components for inspection while the housing recesses that house the genuine products are kept sealed. The pre-use inspection may be, for example, quality inspection of electrical characteristics and the like, inspection for differences between product label information and actual packaging products, or the like.

The housing recess 21A may serve both as a housing recess for direction identification and a housing recess for inspection.

In the present embodiment, each housing recess 21 includes a bottom 212 and a peripheral wall 213, and the opening portion 211 opposes the bottom 212. The bottom 212 is substantially parallel to the strip portions 22. The peripheral wall 213 stands from the periphery of the bottom 212. The opening portion 211 is provided at an end of the peripheral wall 213 connected to the strip portions 22.

In a plan view seen from the height direction, preferably, the opening portion 211 of each housing recess 21 has a shape without an edge extending in a direction perpendicular to a relative sliding direction (described later) of the cover 40. For example, in a plan view, the opening portion 211 preferably has a substantially circular or oval shape. In addition, in a plan view, the opening portion 211 may have a polygonal shape such as a rhombus having one pair of vertices in the longitudinal direction and the other pair of vertices in the width direction.

Due to such a shape of the opening portion 211, sliding the cover 40 relative to the main body 20 causes gradual changes in the adhesion area in the peeling direction where the cover sheet 30 is adhered to the main body 20, specifically around the opening portions 211. This prevents a momentarily strong force from being applied to an adhesion portion 33 (see FIG. 11) of the cover sheet 30 upon peeling the cover sheet 30 so that the cover sheet 30 can be prevented from being broken or becoming non-peelable.

The housing recesses 21 are made of resin. Preferably, the surface resistivity of an inner surface of each housing recess 21 is 0 Ω/sq to $1 \times 10^9$ Ω/sq, for example. This prevents or reduces electrostatic sticking of the electronic components 1 to the inner surface of the housing recess 21.

The strip portions 22 are configured to be capable of fitting in the respective guides 42 of the cover 40 (described later). The main body 20 is held by the cover 40 in the height direction by fitting the strip portions 22 of the main body 20 in the respective guides 42 of the cover 40.

Each strip portion 22 includes a front side 22a and a back side 22b. The strip portions 22 are substantially parallel to an opening plane 214 of each housing recess 21.

As shown in FIG. 11, preferably, the opening portion 211 includes the bulge portion 23 at an opening end. The bulge portion 23 may be provided around the housing recess 21 of the main body 20. The bulge portion 23 bulges upward in a direction (an upward direction in FIG. 11) opposite to the depth direction (a downward direction in FIG. 11) of the housing recess 21.

The bulge portion 23 surrounds the opening portion 211. In a plan view seen from the height direction, the bulge portion 23 has substantially the same shape as that of the edge defining the opening portion 211. Preferably, an opening edge of the housing recess 21 adjacent to the opening portion 211 has a curved part. Preferably, the bulge portion 23 has a curved part that curves on the opening portion 211 side to follow the housing recess 21 in the depth direction toward the bottom 212 of the housing recess 21.

The bulge portion 23 has a height of 0.5 mm to 1.2 mm, for example. When the bulge portion 23 has a height in the above range, it makes it possible to prevent or reduces sandwiching of the electronic components 1 or the like between the cover 40 and the strip portions 22. The bulge portion 23 has a width of about 1 mm to 2 mm, for example. When the bulge portion 23 has a width in the above range, it makes it possible to reduce the force required to peel the cover sheet 30 from the bulge portion 23. This prevents or reduces deformation of the cover 40 and the main body 20, allowing the cover sheet 30 to be stably peeled from the bulge portion 23.

Cover Sheet

In the present embodiment, as shown in FIG. 10, FIG. 11, and FIG. 12, the cover sheet 30 is held by being wound around the cover 40. Specifically, the cover sheet 30 is preferably wound around the cover 40, using the width direction as a winding axis. Thus, the cover sheet 30 includes a portion 31 adjacent to a front side 40a of the cover 40 and a portion 32 adjacent to a back side 40b of the cover 40 (see FIG. 11).

As shown in FIG. 10, a first end 30a and a second end 30b of the cover sheet 30 are connected to each other by, for example, an adhesive tape 35. Specifically, the first end 30a side and the second end 30b side of the cover sheet 30 are connected in an overlapping manner.

As described later, after the cover sheet 30 is adhered to each of the multiple bulge portions 23, the cover sheet 30 is wound around the cover 40. Subsequently, the ends of the cover sheet 30 are connected to each other. The ends of the cover sheet 30 are not necessarily connected by an adhesive tape as described above and may be connected by any method as long as the ends are connected to each other.

As described later, the cover sheet 30 is wound around the cover 40 in such a manner that the cover sheet 30 circles around the cover 40 in conjunction with the relative sliding of the cover 40. The cover sheet 30 rotates around the cover 40 in DR4 direction shown in FIG. 13 when the cover 40 slides relatively in the sliding direction (AR1 direction in FIG. 13).

As described above, the cover sheet 30 is peelably adhered to at least a portion of the main body 20. The cover sheet 30 includes the adhesion portion 33 (see FIG. 11) adhered to at least a portion of the main body 20, specifically around each of the multiple opening portions 211.

The adhesive strength of the cover sheet 30 is preferably 0.4 N/mm$^2$ to 1.0 N/mm$^2$, more preferably 0.4 N/mm$^2$ to 0.6 N/mm$^2$. When adhesive strength of the cover sheet 30 is in the above range, the adhesiveness between the cover sheet 30 and the main body 20 can be maintained.

The adhesive strength of the cover sheet is measured by, for example, a measurement method according to a peel strength test of cover tape of taping packaging components defined in JIS C0806-3 (P. 21).

The cover sheet 30 is made of a heat-weldable material, for example. In this case, the cover sheet 30 is adhered by heat welding to the main body 20, more specifically, to each of the multiple bulge portions 23. The adhesiveness between the cover sheet 30 and the bulge portions 23 at the adhesion portion 33 is preferably smaller in order to prevent or reduce attachment of the electronic components 1 to a portion of the peeled cover sheet 30 when the electronic components 1 are taken out from the housing recesses 21.

The cover sheet 30 may be adhered to the main body 20, more specifically, to the bulge portions 23 by an adhesive. The cover sheet 30 is preferably transparent but may not necessarily be transparent.

Preferably, the surface resistivity of the cover sheet 30 is 1×10$^{11}$ Ω/sq or less. This can prevent or reduce electrostatic sticking of the electronic components 1 to the surface of the cover sheet 30.

Cover

In the present embodiment, as shown in FIG. 10, FIG. 11, and FIG. 12, the cover 40 is arranged to sandwich a portion of the cover sheet 30 between the cover 40 and the main body 20, more specifically, between the cover 40 and the bulge portion 23. Preferably, a side of the cover 40 opposing the main body 20 is not fixed or adhered to the cover sheet 30.

In the present embodiment, the cover 40 includes a plate-shaped portion 41 and the guides 42, and fits over the main body 20 in such a manner that it can slide relative to the main body 20 in the longitudinal direction. The plate-shaped portion 41 extends in the longitudinal direction. The plate-shaped portion 41 is substantially parallel to the strip portions 22. The cover sheet 30 is wound around the plate-shaped portion 41.

The guides 42 are provided at the ends of the plate-shaped portion 41 in the width direction.

The guides 42 guide sliding of the cover 40 relative to the main body 20 while preventing the cover 40 from falling out of the main body 20. Specifically, the guides 42 are arranged at the ends of the respective strip portions 22, with a space therebetween, such that each strip portion 22 is positioned between a portion opposing the front side 22a of the strip portion 22 and a portion opposing the back side 22b of the strip portion 22.

The shape of the guide 42 can be suitably changed as long as the cover 40 can slide relatively to the main body 20.

The cover 40 is formed by, for example, molding such as vacuum molding or injection molding. Examples of materials of the cover 40 include resin. The cover 40 may or may not be transparent. When the cover 40 and the cover sheet 30 are transparent, the multiple electronic components 1 being housed in the housing recesses 21 can be confirmed by visual observation or the like.

Preferably, the cover 40 is longer than the main body 20 in the longitudinal direction. Preferably, the length of the cover 40 is equal to or less than half the length of the cover sheet 30 in the longitudinal direction.

Preferably, the electronic component package 100 shown in FIG. 10 is produced as follows.

First, a required number of electronic components 1 are housed in predetermined housing recesses 21, and the multiple housing recesses 21 are covered with the cover sheet 30. Thereafter, the cover sheet 30 is heat welded and adhered to the multiple bulge portions 23. When covering the multiple housing recesses 21 with the cover sheet 30, the cover sheet 30 is arranged on the main body 20 in the longitudinal direction in such a manner that the cover sheet 30 sticks out from the ends of the main body 20 in the longitudinal direction. Next, the cover sheet 30 is cut to a predetermined length. The predetermined length is a length that allows the cover sheet 30 to be wound around the cover 40. Subsequently, the cover 40 is arranged to sandwich the cover sheet 30 on the main body 20 between the cover 40 and the main body 20. Subsequently, as described above, the portions of the cover sheet 30 sticking out of the ends of the main body 20 are wound around the cover 40, and the ends of the cover sheet 30 are adhered to each other. As a result, the electronic component package 100 in which the multiple electronic components 1 are sealed in the multiple housing recesses 21 is produced.

The electronic component housing container 10 has a longitudinal dimension (a length indicated by $L_{10}$ in FIG. 10 and FIG. 12) of 169 mm±1 mm, for example. The electronic component housing container 10 has a width dimension (a length indicated by $W_{10}$ in FIG. 10 and FIG. 11) of 35.8 mm±1 mm, for example. The electronic component housing container 10 has a height dimension (a length indicated by $H_{10}$ in FIG. 10 and FIG. 11) of 13.7 mm, for example.

In the electronic component housing container 10, the fitting portion of the main body 20 and the cover 40 has a height (a length indicated by $H_{20}$ in FIG. 11) of 2 mm±0.2 mm, for example.

Figure 13:
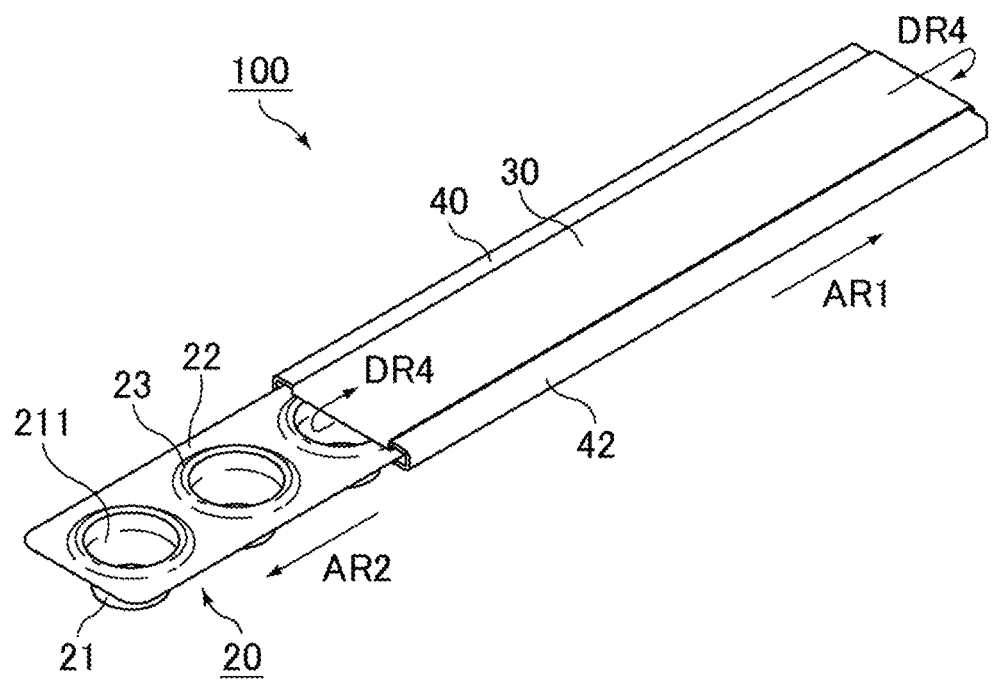
FIG. 13 is a schematic perspective view of sliding a cover of the electronic component package shown in FIG. 10 relatively to a main body.
Figure 14:
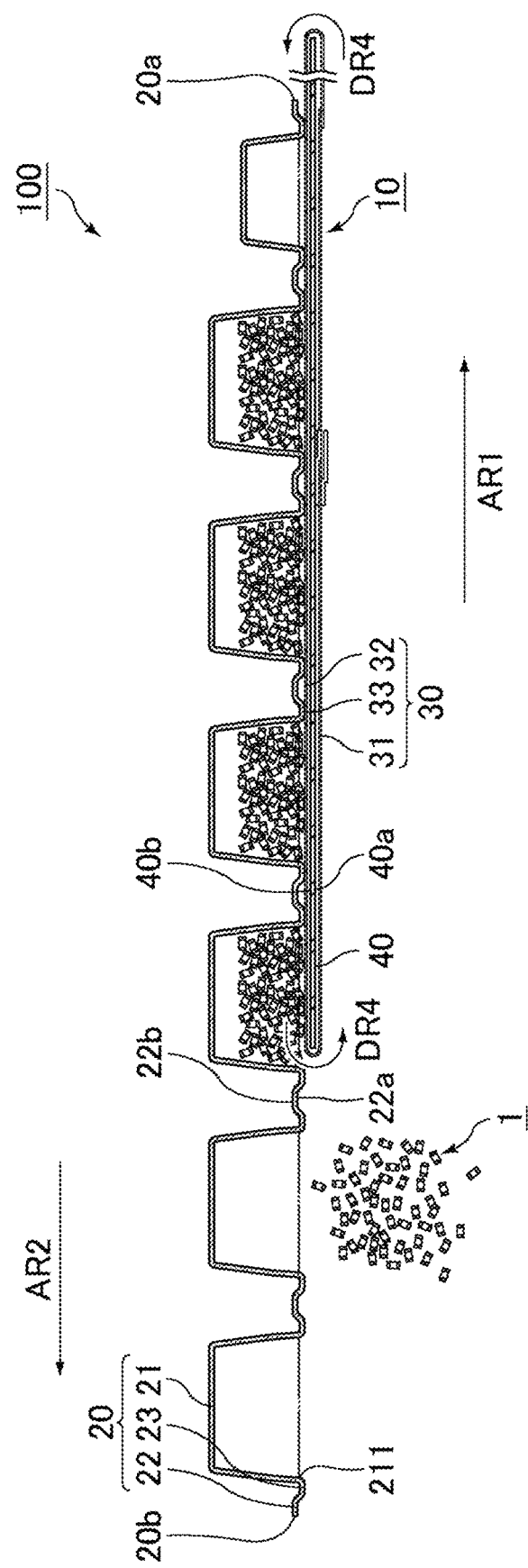
FIG. 14 is a schematic cross-sectional view of taking out electronic components from the electronic component package shown in FIG. 10.

FIG. 13 is a schematic perspective view of sliding a cover of the electronic component package shown in FIG. 10 relatively to a main body. FIG. 14 is a schematic cross-sectional view of taking out electronic components from the electronic component package shown in FIG. 10. For convenience sake, FIG. 13 shows the electronic component package 100 with the opening portions 211 of the housing recesses 21 facing up. Yet, when taking out the electronic components 1, it is preferred to slide the cover 40 relative to the main body 20 while the electronic component package 100 is placed with the opening portions 211 of the housing recesses 21 facing down as shown FIG. 14. The following describes how the electronic components 1 are taken out from the electronic component package 100 according to the present embodiment, with reference to FIG. 13 and FIG. 14.

As shown in FIG. 13 and FIG. 14, the multiple electronic components 1 housed in the housing recesses 21 are taken out by sliding the cover 40 relatively to the main body 20 in the sliding direction (AR1 direction). Specifically, the cover 40 is fixed by a fixing device (not shown) to slide the main body 20 in a direction (AR2 direction) opposite to the AR1 direction. The main body 20 is moved by a predetermined distance by a transfer device (not shown). The transfer device may be a conveyor that moves the main body 20 placed thereon, or may be configured to move the main body 20 by gripping the main body 20. Here, when the housing recess 21A is provided as a housing recess for direction identification, it makes the direction identifiable by the appearance, thus reducing the risk of attaching the electronic component housing container to equipment such as a fixing device in a wrong direction. This consequently also reduces the risk of peeling the cover sheet 30 in a wrong direction.

When the cover 40 moves relatively in the sliding direction (AR1 direction), first, peeling force acts on the adhesion portion 33 positioned downstream of the relative sliding direction of the cover 40. Further relative sliding of the cover 40 allows the cover sheet 30 to be gradually peeled in the relative sliding direction of the cover 40.

At this time, the cover sheet 30 rotates around the cover 40 as indicated by DR4 direction in conjunction with the relative sliding of the cover 40. Specifically, at the downstream of the relative sliding direction of the cover 40, the portion 32 adjacent to the back side 40b of the cover 40 moves to be adjacent to the front side 40a of the cover 40, while at the upstream of the relative sliding direction of the cover 40, the portion 31 adjacent to the front side 40a of the cover 40 moves to be adjacent to the back side 40b of the cover 40. In this manner, the cover sheet 30 rotates around the winding axis.

When focus is set on one housing recess 21, the cover sheet 30 is peeled from the periphery (the bulge portion 23) of the opening portion 211, from one end to the other end in the relative sliding direction of the cover 40, whereby the housing recess 21 is opened. As the housing recess 21 is opened, the multiple electronic components 1 drop downward from the opening portion 211 to be supplied to a supply receiving unit.

Here, preferably, the housing recess 21 has a smooth inner periphery without grooves or the like, so that catching of the multiple electronic components 1 on the inner periphery of the housing recess 21 can be prevented or reduced, and the multiple electronic components 1 can be smoothly taken out from the electronic component housing container 10.

As the cover 40 slides relatively in AR1 direction from the second end 20b side to the first end 20a side of the main body 20, the cover sheet 30 is peeled from the bulge portions 23 in a direction from the second end 20b side to the first end 20a side of the main body 20, whereby the housing recesses 21 are sequentially opened. As a result, the multiple electronic components 1 are sequentially taken out from the opened housing recesses 21. The relative sliding of the cover 40 may be performed continuously or intermittently.

As described above, the electronic component package 100 according to the present embodiment allows the multiple electronic components 1 to be smoothly taken out from the electronic component housing container 10.

In the present embodiment, the cover 40 is configured such that its side opposing the main body 20 is not adhered to the cover sheet 30, so that the cover 40 can move smoothly by the sliding of the cover 40 relative to the main body 20. Further, the cover sheet 30 can also move relative to the cover 40, which allows easy peeling of the cover sheet 30 from the main body 20.

In addition, the cover 40 can slide relatively to the main body 20 while the cover sheet 30 is held by the cover 40, and such a configuration achieves automatic opening of the housing recesses 21 with the use of the fixing device and the transfer device. This allows the multiple electronic components 1 to be automatically supplied to the supply receiving unit.

Further, the cover 40 can slide relatively to the main body 20 in a direction parallel to the opening plane of the housing recesses 21 while the cover sheet 30 is held by the cover 40, and such a configuration can prevent or reduce deformation of the cover 40 and the main body 20 during peeling of the cover sheet 30.

Other Embodiments

While preferred embodiment of the method of measuring the adhesive strength of a cover sheet and the carrier plate of the present disclosure have been described above, various modifications and changes can be made without departing from the scope and spirit of the present disclosure, for example, in terms of configuration and production conditions of electronic component housing containers, electronic component packages, and carrier plates.

For example, identification labels may be attached to a top side and a bottom side of the electronic component housing container 5 or 10.

Specifically, a first identification label may be attached to the cover sheet 30 of the electronic component housing container 5, and a second identification label may be attached to the main body 20 of the electronic component housing container 5. Alternatively, the first identification label may be attached to the cover 40 of the electronic component housing container 10, and the second identification label may be attached to the main body 20 of the electronic component housing container 10. The first identification label may be attached between the cover sheet 30 and the cover 40 or on a top side of the cover sheet 30.

For example, the first identification label includes the same barcode information as two-dimensional code information on the second identification label. The barcode information on the first identification label includes, for example, production identification code, component identification code, quantity code, and traceability code. The first identification label may further include readable information written in letters.

For details, refer to IEC 62090:2017 (Product package labels for electronic components using bar code and two-dimensional symbologies).

The second identification label is attached to, for example, a back side of the housing recess 21 located closest to the second end 20b of the main body 20, among the housing recesses 21 that house the electronic components 1 which are genuine products.

For example, the second identification label only includes the same two-dimensional code as the barcode information on the first identification label.

The above embodiment describes the case where the main body 20 slides while the cover 40 is fixed, but the cover 40 may slide while the main body 20 is fixed. When the main body 20 slides while the cover 40 is fixed, the multiple electronic components 1 can be stably supplied to the supply receiving unit without changing the position of the supply receiving unit.

The above embodiment describes the case where the bulge portion 23 is provided around each opening portion 211 of the main body 20, but no bulge portions 23 may be provided. In this case, preferably, an inner periphery of each housing recess 21 defining the opening portion 211 includes a curved part that curves on an opening edge to follow the housing recess 21 in the depth direction toward the bottom 212 of the housing recess 21.

The above embodiment describes the case where the guides 42 are provided to the cover 40, but the guides may be provided to the main body 20. In such a case, the cover 40 is formed in a flat plate shape, and the guides are formed at the ends of the strip portions 22 of the main body 20 in the width direction. The guides are configured to bend from the back side 40b of the cover 40 to the front side 40a of the cover 40 over the end faces of the cover 40.

What is claimed is:

1. A method of measuring the adhesive strength of a cover sheet, the method being applicable to an electronic component housing container comprising a main body including multiple housing recesses configured to house electronic components in a longitudinal direction in which each housing recess includes an opening portion on one side in a height direction, and the cover sheet which is peelably adhered to the main body to cover the opening portion of each housing recess, the method comprising:

mounting the electronic component housing container on a carrier plate by fitting the housing recesses in one or more housing holes of the carrier plate, the carrier plate comprising a plate body having the one or more housing holes configured to receive the housing recesses in the longitudinal direction and multiple sprocket holes spaced apart from the housing holes in a width direction perpendicular to the longitudinal direction and arranged at regular intervals in the longitudinal direction;

engaging some tooth tips of a sprocket, comprising a plurality of the tooth tips on a periphery, in the sprocket holes of the carrier plate carrying the electronic component housing container; and peeling the cover sheet from the main body by rotating the sprocket using the width direction as an axis to move the carrier plate in the longitudinal direction.

2. The method of measuring the adhesive strength of a cover sheet according to claim 1, wherein
    during the peeling of the cover sheet from the main body, a peeling angle of the cover sheet relative to the main body is kept constant.

3. The method of measuring the adhesive strength of a cover sheet according to claim 2, further comprising
    rolling up the cover sheet peeled from the main body while moving the carrier plate in the longitudinal direction.

4. The method of measuring the adhesive strength of a cover sheet according to claim 1, wherein
    the plate body of the carrier plate has the multiple housing holes configured to receive the respective housing recesses in the longitudinal direction.

5. The method of measuring the adhesive strength of a cover sheet according to claim 2, wherein
    the plate body of the carrier plate has the multiple housing holes configured to receive the respective housing recesses in the longitudinal direction.

6. The method of measuring the adhesive strength of a cover sheet according to claim 3, wherein
    the plate body of the carrier plate has the multiple housing holes configured to receive the respective housing recesses in the longitudinal direction.

7. A carrier plate configured to carry an electronic component housing container comprising a main body including multiple housing recesses configured to house electronic components in a longitudinal direction in which each housing recess includes an opening portion on one side in a height direction, and a cover sheet peelably adhered to the main body to cover the opening portion of each housing recess,
    the carrier plate comprising:
    a plate body having one or more housing holes configured to receive the housing recesses in the longitudinal direction and multiple sprocket holes spaced apart from the housing holes in a width direction perpendicular to the longitudinal direction and arranged at regular intervals in the longitudinal direction.

8. The carrier plate according to claim 7, wherein
    the plate body of the carrier plate has the multiple housing holes configured to receive the respective housing recesses in the longitudinal direction.

* * * * *